July 18, 1950     H. T. BUDENBOM     2,515,332
OBJECT LOCATING SYSTEM
Filed Aug. 12, 1943     3 Sheets—Sheet 2
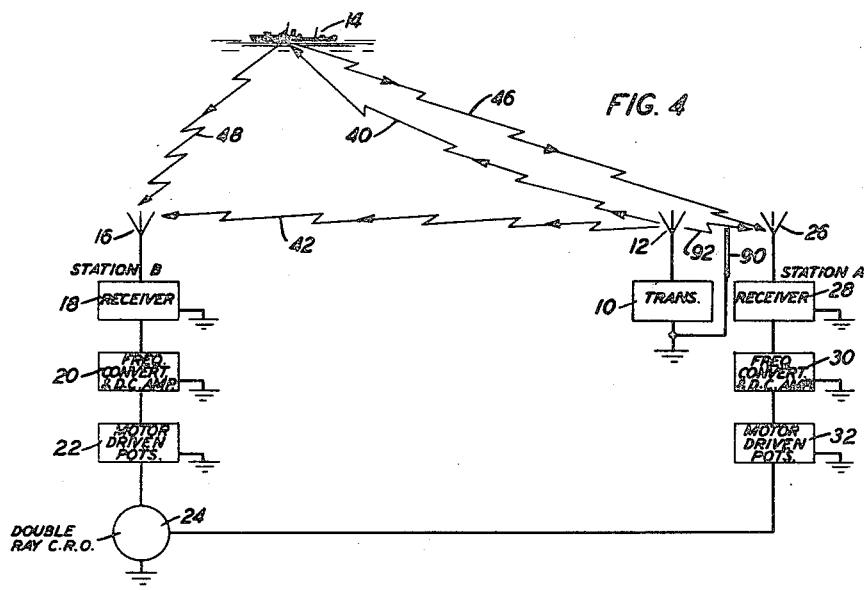
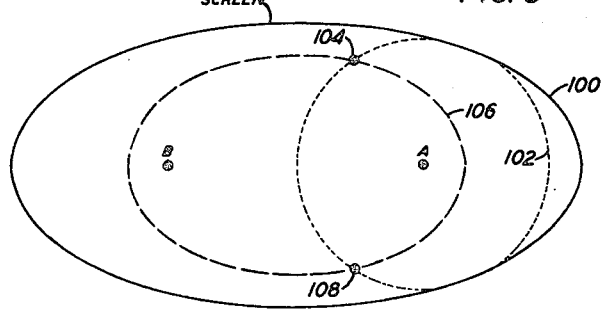
INVENTOR
H. T. BUDENBOM
BY
H. O. Wright
ATTORNEY July 18, 1950  H. T. BUDENBOM  2,515,332
OBJECT LOCATING SYSTEM
Filed Aug. 12, 1943  3 Sheets-Sheet 3
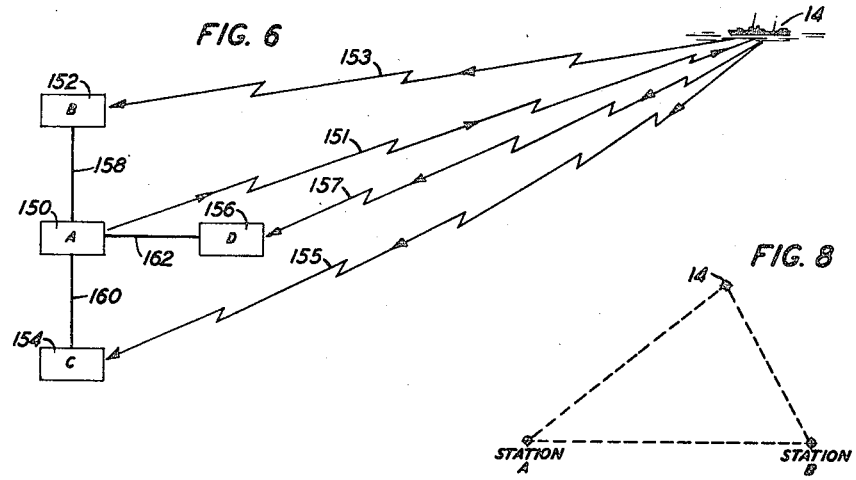
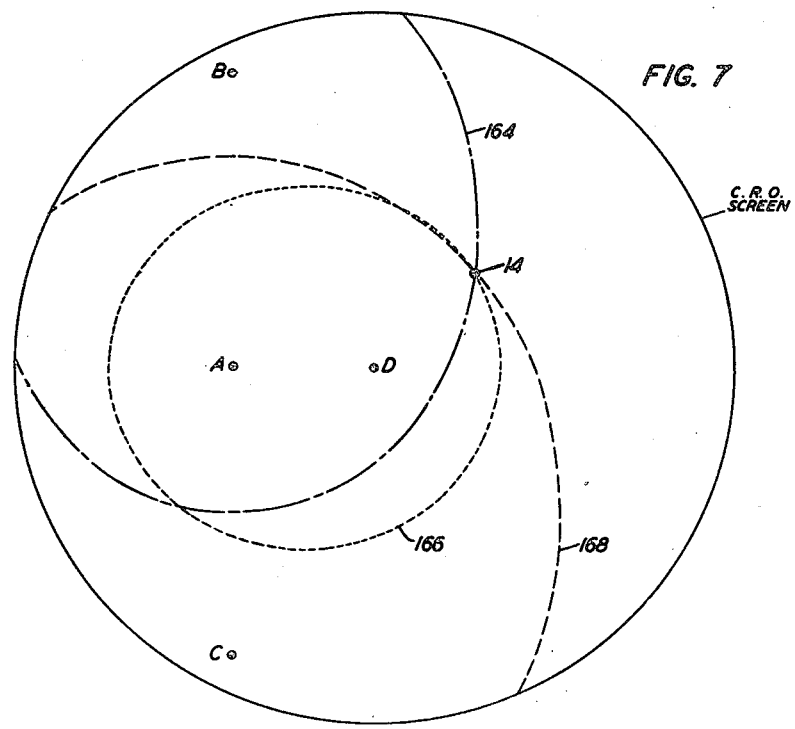
INVENTOR
H. T. BUDENBOM
BY
H. O. Wright
ATTORNEY Patented July 18, 1950

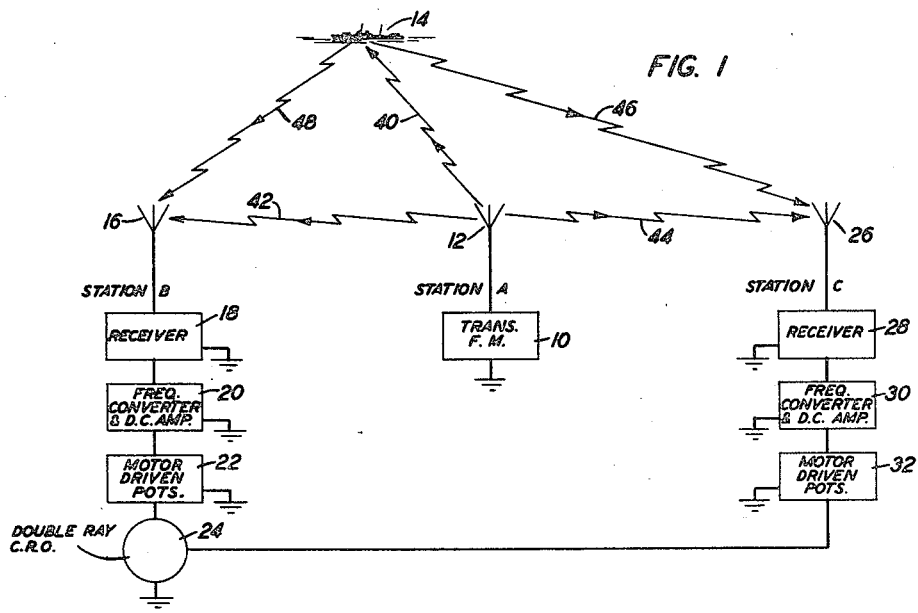
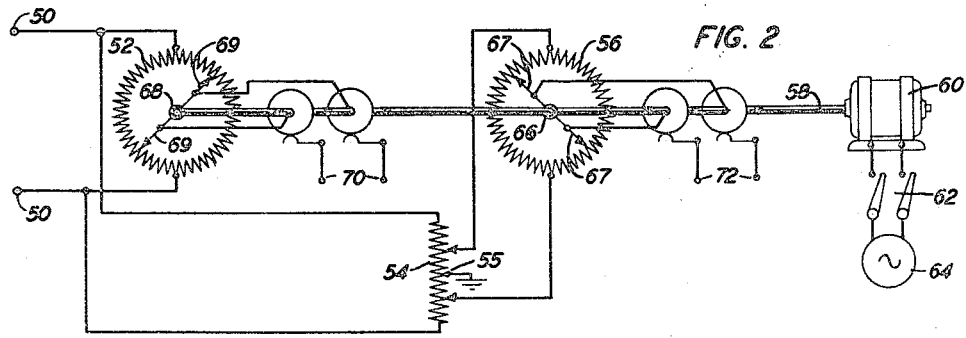
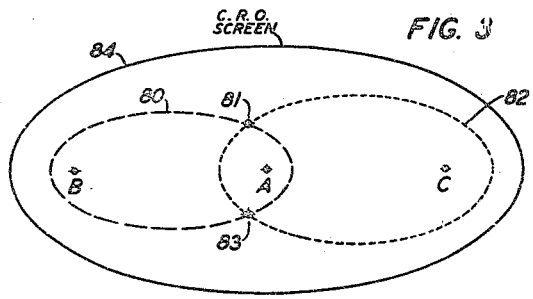

2,515,332

UNITED STATES PATENT OFFICE 2,515,332

OBJECT LOCATING SYSTEM

Horace T. Budenbom, Short Hills, N. J., assignor to Bell Telephone Laboratories, Incorporated, New York, N. Y., a corporation of New York Application August 12, 1943, Serial No. 498,323

9 Claims. (Cl. 343—15)

This invention relates to novel object locating systems employing reflected waves. More particularly, it relates to systems of the above-mentioned type in which one or more receiving stations are situated at a material distance from the transmitting station whereby an elliptical locus or several such loci may be established for any particular object from which reflections of the transmitted waves are received.

Patents 2,247,662 and 2,261,272 issued July 1, 1941 and November 4, 1941, respectively, to R. C. Newhouse are, for example, illustrative of the use of reflected frequency modulated radio waves in measuring distance in systems in which the separation between the transmitting and receiving apparatus of the system is relatively very small. In such systems a beat-note is obtained by combining the instantly transmitted energy with the received reflected wave energy, the frequency of which beat-note is an index of the distance of the surface or object from which the reflected waves are received. In such systems reflections from all objects at the same distance from the transmitting and receiving system will produce the same beat-note frequency, i. e., if the energy were broadcast in all directions from a station at a point in a plane and reflections were received at said station from several objects in said plane, which reflections when combined with the instantly transmitted energy, all produced the same beat-note frequency, the objects would then be known to lie on a locus which is a circle having the radio system located at its center. In such a system the distance from the station to all objects from which reflections were received could be ascertained, as taught in the above-mentioned patents to Newhouse. Of course, the respective directions of the several objects would not be known. Nor could it be determined whether a particular beat-note resulted from reflections from one or from several objects at the discrete distance indicated by the frequency of a particular beat-note, unless additional apparatus were employed to provide more information. However, without any additional apparatus an observer at the station would be informed as to whether any reflecting objects were within th range of the system and, if any were within range, he would also be informed of the distance from the station of each reflecting object. (Or each group of reflecting objects in the event that some of the objects were grouped at substantially the same distance, i. e., were on the same circular locus with respect to the point at which the station is located.) It is therefore obvious that even such an elementary system would be of substantial utility in that it would provide indications of the approach of reflecting objects and would indicate the distance at each instant of such objects. Such a system would prove valuable, for example, to coast guards or lighthouse attendants to indicate whether ships in the vicinity were approaching an area within which dangerous reefs, shoals or the like, were known to be located, in which event some convenient warning means such as a bell, whistle, gun, radio telegraph, or the like could be employed to warn the approaching vessel away from the dangerous area. Such an elementary system would also, by way of further example, be of substantial utility for routine "look-out" operation on war craft or at coastal defense stations and would apprise an observer of the intrusion of any additional reflecting object within the area covered by the system. Continued observation would, of course, also indicate whether or not the intruding object was changing its distance with respect to the observing station. When the presence of a new object in the area of interest has been made known by use of the elementary system, additional object locating facilities of a more complex nature can then be brought into use to provide additional information concerning the object, such as its direction and whether it is a single object or a group of objects. Many radar systems are, of course, well-known in the art which will provide such additional information. Another principal object of the invention as illustrated by the above described and similar elementary systems is therefore to reduce the operating time required of associated more complicated systems and thus to prolong the useful life of the latter systems.

If, moreover, in an elementary system of the general type described above, there is a material separation between the transmitting and receiving antennas of the system, the locus for all objects producing a given beat-note will be an ellipse with the transmitter at one focus thereof and the receiver at the other. This becomes apparent since an ellipse is the locus of all points for which the sum of the distances to two points, (i. e., the focal points) is a constant. An elementary system providing an elliptical locus is, for example, peculiarly well adapted for routine "look-out" service in connection with Coast Guard or Coastal Defense installations where an extensive length of coastal waters is to be covered since by placing the transmitting and receiving stations of the system on a base line substantially parallel to the major axis of the sector of coastal waters to be covered and separating them by a distance which is substantially greater than the maximum distance offshore over which "look-out" service is particularly desired, large portions of the elliptical loci for objects within the area to be covered will be nearly straight (i. e., only slightly curved) lines which are, for practical purposes, substantially parallel to the shore and base lines. Stated in other words the distance between foci (and consequently the length of the major axis of the ellipse) is, preferably, for coastal "look-out" service, or similar uses, made substantially larger than the maximum offshore distance over which observations are desired so that the loci provided by the system will be elongated and relatively "flat" ellipses. An extremely long coast line such as the Atlantic or Pacific coast of the United States could obviously be covered for "look-out" purposes by a chain of such elementary systems. Preferably when "look-out" service is the primary consideration, the system should "overlap" sufficiently that any object approaching the coast at any point would have to pass through a region covered by relatively straight portions of the elliptical loci of one of the chain of elementary systems. Successive systems in the chain should then preferably operate at and be tuned to different frequencies or any of numerous other measures well known to those skilled in the art can be employed to avoid any mutual interference. As suggested hereinafter in connection with the elimination of ambiguous indications in single systems, the transmitting and receiving antennas of each system can preferably be made broadly directive to prevent transmission to or reception of reflections from objects so located with respect to one or more of the several stations that they would fall on the sharply curved portions at the end of the elliptical loci. The overlapping of successive systems in the chain should of course be sufficiently great that objects so excluded from the curved portions of the elliptical loci of the one system would be located on the substantially straight portions of the loci of the next adjacent system in the chain. Thus, an approximate indication of the distance of any approaching object from the coast line would be afforded and it would be placed within a particular definite sector.

Even in the case in which a single elementary system of this type (i. e., a single transmitting station and a single remotely located receiving station) are employed with antennas, the directive characteristics of which are at least sufficiently broad to cover the entire area over which observation is desired, an observer is apprised of the approach of an intruding object and the object is definitely placed upon the perimeter of the known region corresponding to the applicable elliptical locus so that such a simple system, per se, possesses substantial utility for "look-out" service and it can, of course, be employed to relieve more complex radar systems during intervals of time in which simple "look-out" service is deemed sufficient.

If, further, there is a second receiving antenna at a material distance in a second direction with respect to the transmitting antenna, a second elliptical locus can be established for any particular reflecting object.

Likewise, a third elliptical locus can be established by locating a third receiving antenna at a third direction from the transmitting antenna, and so on for as many loci as may be found desirable. Further loci may be obviously obtained, also, by adding transmitting equipment at one or more of the receiving points, such additional transmitters to operate in sufficiently different frequency ranges to avoid possible confusion.

The several loci obtained may be compared or superimposed by graphical methods or by suitably arranged oscilloscopic indicators, as will be described in detail hereinafter, and the location of the reflecting object with respect to a given reference point, such as the point at which the transmitting station is located, may be obtained by determining the points of intersection of two or more loci. Obviously the indications provided must, for the sake of convenience, be presented to a reduced scale. Obviously, also, given the exact position of each focus and the sum of the distances from a reflecting object to the two foci, the elliptical locus can be precisely calculated and precisely constructed (by well-known methods) to any convenient scale. Furthermore, since the two focus points, i. e., the point at which the transmitting apparatus is located and that at which the receiving apparatus is located, are definitely fixed physical points, the locus obtained for any specific set of data represents to the reduced scale of the indication an actual physical line having a true elliptical form about the two foci, or stations. The accuracy of a system of the invention can therefore be readily determined by observations resulting from reflections from an object, the position of which with respect to the foci is definitely known and comparing the corresponding indications provided by a system of the invention with a precisely constructed locus about the known foci drawn to the same scale and passing through the point corresponding to the known position of the object. Ambiguities, when present, may be readily eliminated by the use of antennas having suitable directive characteristics.

Systems of the invention can obviously employ pulse reflection type distance measuring arrangements and phase comparison distance measuring arrangements in lieu of the frequency modulated wave distance measuring arrangements above mentioned to provide the required indications of the difference in the distances travelled by the directly received energy and the received reflected energy from the object.

An object of the invention is to provide new and improved distance measuring and object locating systems which will facilitate the location of objects with respect to known reference stations.

A further object is to provide object detecting systems which will conveniently permit continuous coverage of a substantial area without the necessity of providing continuous scanning of said area by highly directive energy emitting or receiving means.

Another object is to provide an object detecting system which will permit the accurate determination of the distance and direction of the detected object from known reference stations.

Other and further objects will become apparent during the course of the following description of illustrative systems embodying the principles of the invention in conjunction with the accompanying drawings, in which:

Fig. 1 shows in schematic diagram form a system employing certain principles of the invention;

Fig. 2 shows in schematic form one mechanism for providing deflecting voltages to a cathode ray oscilloscope which will produce an elliptical trace, the magnitude of the parameters of the ellipse being proportioned to correspond with the magnitude of a signal voltage obtained by a system such as that of Fig. 1;

Fig. 3 illustrates the tracing of a pair of elliptical figures on the target of an oscilloscope as is contemplated in connection with the system of Fig. 1;

Fig. 4 illustrates in schematic diagram form a system of the invention employing one receiving station in close proximity with the transmitting station and a second receiving station at a distance;

Fig. 5 illustrates the tracing of an ellipse and a circle on the target of an oscilloscope as is contemplated with the system of Fig. 4;

Fig. 6 illustrates in diagrammatic form a system of the invention employing three receiving stations at points removed from the transmitting station;

Fig. 7 shows an oscilloscope target having three elliptical traces thereon as contemplated for the system of Fig. 6; and Fig. 8 is a diagram employed in explaining features of certain systems of the invention.

In more detail, in Fig. 1 a transmitter 10 at station A generates frequency modulated waves, as is taught for example in the above-mentioned patents to R. C. Newhouse. These waves are radiated from antenna 12 to cover an area in which is an object 14 to be located.

At a second station designated B, an appreciable distance from station A, a receiver 18 is connected to an antenna 16 and receives a reflection 48 of wave 40 which, proceeding from transmitting antenna 12, strikes the object 14. A component 42 of the energy radiated from antenna 12 is also received by antenna 16 by direct radiation. The two components 42 and 48 are combined and detected in receiver 18 to produce a beat-note which will have a frequency proportional to the difference in the distances traveled by the two components, i. e., the difference between the sum of the distances from station A to the object and from the object to station B and the distance from station A to station B. Since the last-mentioned distance is constant, the beat-note frequency will be indicative of the first-mentioned sum of the distances from station A to the object and from the object to station B as well as the difference between the distances travelled by the two components.

The beat-note frequency thus obtained can then be converted by converter 20 into a direct current voltage the magnitude of which is proportional to the frequency of the beat-note as taught, for example, in connection with Fig. 6 of the copending allowed application of R. C. Newhouse, Serial No. 437,013, filed March 31, 1942, assignor to applicant's assignee. This application issued as United States Patent 2,405,231 on August 6, 1946.

The direct current voltage thus obtained can then be provided to a pair of ganged motor-driven potentiometers 22, as illustrated in detail in Fig. 2, to obtain sine and cosine voltages which when applied to the horizontal and vertical deflecting plates respectively controlling the deflection of one ray of a cathode ray oscilloscope 24 will cause the ray to trace an ellipse upon the target of the tube, the ellipse representing, as above explained, the locus of all points at which reflecting objects will give rise to a beat-note of the observed frequency. The ellipse appearing on the oscilloscope must, of course, represent with reasonable precision the actual elliptical locus, to a reduced scale, upon which the object is located. Obviously the actual ellipse is completely determined by the location of its two focus points (the transmitting station being at one focus point and the receiving station being at the other) and by the difference between the interfocal distance and the distance traveled by the reflected waves in going from the transmitter to the object and thence to the receiver. To calibrate the system initially the lengths of the major and minor axes of the actual ellipses for a number of reflecting objects at known points (such as the five mile points along the minor axis, for example) can, obviously, be calculated. The gain of the system is then adjusted so that for each calibration point the magnitude of the direct current voltage obtained by converting the corresponding beat note frequency for that point will just suffice to deflect or sweep the cathode ray beam horizontally the proper distance, to the reduced scale of the oscilloscope pattern, corresponding to the major axis of the actual ellipse. Similarly, potentiometer 54 is then adjusted so that the maximum vertical sweep will just correspond, to the reduced scale of the oscilloscope pattern, to the minor axis of the actual ellipse.

If, as is recommended above, the interfocal point spacing is made large with respect to the maximum distance from the base line (or line of the focal points) over which observations are to be made, the ratio of minor axis to major axis lengths will remain approximately constant over substantial portions of the area of interest and only minor readjustments of the potentiometer 54 will be necessary when the object under observation passes from one portion to another of the observation area.

As a further means of checking that the locus traced on the oscilloscope corresponds accurately with the actual locus upon which the object is located, a frequency meter can be inserted in the output of the receiver to measure the frequency of the beat note produced by combining the directly received and received reflected components and graphical or tabulated data can then be consulted to determine the correct lengths of the major and minor axes of the actual elliptical locus whereupon the receiver gain and potentiometer 54 can be adjusted, as may be required, to make the locus trace upon the oscilloscope screen and accurate reproduction of the actual locus, to the reduced scale of the oscilloscope screen. Numerous other methods of producing appropriate elliptical traces and of adjusting and checking the adjustment thereof, can, obviously, be readily devised by those skilled in the art.

In a like manner, reflections 46 from object 14 are received on antenna 26 at a third station C and combined in receiver 28 with energy wave 44 directly received from station A to obtain a second beat-note indicative of the combined distances from station A to object 14 and from object 14 to station C. This frequency is likewise converted by converter 30 into a direct current voltage the magnitude of which is proportional to the frequency of the beat-note and this direct current is provided to a second pair of motor-driven ganged potentiometers 32 to obtain a second set of sine and cosine voltages which are applied to the horizontal and vertical deflecting plates, respectively, controlling the deflection of a second ray of the cathode ray oscilloscope 24 and causing the second ray to trace a second ellipse upon the target of the tube, the second ellipse representing the locus of all points at which reflecting objects will give rise to the beat-note of the observed frequency at station C.

The pair of ellipses which are thus obtained is indicated in Fig. 3 in which 84 is the target or screen of double ray cathode ray oscilloscope 24, which oscilloscope can conveniently be of the type described in detail in U. S. Patent 2,170,944 issued August 29, 1939 to M. S. Glass et al. Alternative forms of multiple ray cathode tube oscilloscopes are shown in British Patents 426,138 and 432,790. Ellipse 80 is, for example, that corresponding to the reflections received at station B and ellipse 82 is that corresponding to the reflections received at station C.

The object 14 will then be at one of the points 81 or 83 at which these ellipses intercept each other. If the antenna at station A is made broadly directive to transmit to only one side of a line on which stations A, B and C are located, one of these points will be eliminated, for example point 83, and the object 14 will then be definitely located at point 81. Numerous ways of making an antenna broadly directive as suggested above are of course well known to the art, the simplest being the use of a reflecting antenna or a sheet of conductive material spaced substantially one-fourth wavelength "behind" the transmitting antenna. An elementary system of this type is described in connection with Fig. 1 of United States Patent 1,643,323 issued September 27, 1927 to J. S. Stone.

The system of Fig. 1, as above described, can obviously locate a reflecting object without the necessity of scanning an area under observation by a highly directive or "beam" antenna.

It is also obvious, as discussed above, that systems of the invention can be employed to indicate when objects are crossing a particular predetermined defense or danger line as, for example, a line substantially parallel to the coast and at a particular distance therefrom. The entrance of enemy ships within a particular defense area or the entrance of friendly ships into an area filled with dangerous reefs could thus be ascertained.

In Fig. 2 a pair of ganged potentiometers for producing from a direct current source an elliptical motion of the ray of a cathode ray oscilloscope is shown. Potentiometers 52 and 56 are circular in form and double contacts 69 and 67, respectively, traverse the windings of the potentiometers as armatures 68 and 66 are turned by shaft 58 which is driven by motor 68, the power supply for which is designated 84.

Armatures 68 and 66 are mounted normal to shaft 58 and with their longitudinal axes at right angles to each other. When rotated uniformly they provide a sinusoidal variation of voltage at terminals 70 and a cosinusoidal variation of voltage at terminals 72.

The ratio of the voltages at terminals 70 and 72, respectively, is adjusted, as described above, by voltage dividing potentiometer 54 so that when voltage 70 is applied to one pair of deflecting plates of a cathode ray oscilloscope and voltage 72 is applied to the other pair of deflecting plates, the ray will trace an elliptical path having the same relative parameters as the elliptical locus for objects of constant combined distances from stations A and B or A and C, respectively, of the system of Fig. 1 depending upon whether the potentiometers are to be used in connection with signals received at station A or those at station C.

It is therefore apparent that as the direct current voltage, representative of the beat-note frequency, varies, the dimensions of the ellipse will vary correspondingly and represent on the oscilloscope target the locus desired as described in connection with Fig. 1.

In Fig. 3, the cathode ray oscilloscope target 84 can conveniently be of elliptical shape and have marked thereon points A, B and C corresponding, to a reduced scale, to the location of the stations A, B and C, respectively, of Fig. 1. For a particular object located at point 81, by way of example, ellipse 80 will be traced by the ray of the tube controlled by the signals received at station B and ellipse 82 will be traced by the ray of the tube controlled by the signals received at station C, the intersection at point 81 serving to locate the position of the object with respect to the stations A, B and C. Ambiguity arising from the existence of a second point of intersection 83 can be eliminated as suggested above by using a transmitting antenna system which radiates only toward one side of the line of the stations A, B and C. Alternatively, of course, one or both receiving antennas can be made to receive from only one side of the station's line in order to eliminate the ambiguity. The unwanted half of the ellipses can conveniently be blanked out if desirable, by conventional arrangements well known to those skilled in the art. Indeed, in systems such as that employing a chain of overlapping elementary systems and using only the substantially straight portion of one of the nearly straight sides of each successive elongated ellipse, as described above, the entire unused portion of each elongated ellipse can, obviously, be blanked out.

In Fig. 4 a system is shown which is identical with that of Fig. 1 except that the receiving apparatus at station C of Fig. 1 is, in Fig. 4, located at station A closely adjacent to the transmitting apparatus and a small shield 90 of conductive material is interposed between antennas 12 and 26 to reduce the direct transmission of energy between them sufficiently to avoid overloading receiver 28.

As above described, with the receiver at substantially the same point as the transmitter, the locus of all objects, reflections from which will produce a particular beat-note frequency, is a circle the radius of which is equal to the distance of the objects from the point at which the transmitter and receiver are located.

According to Fig. 5 locus 100 is an ellipse corresponding to ellipse 80 of Fig. 3 but locus 102 is a circle, the radius of which is, to the reduced scale of the oscilloscope pattern, a measure of the distance to the object from which reflections are being received. The object will, of course, be represented by one of the points 104 or 106 at which the loci intersect and the ambiguity is again readily resolved by employing one antenna, either receiving or transmitting, which will radiate or receive energy from only one side of the line upon which stations A and B are located.

The cathode ray oscilloscope employing multiple beams such as is required in the systems of Figs. 1 and 4 is preferably of the type described in the above mentioned United States Patent 2,170,944. The centering biases for each ray should, of course, be adjusted so that the ray will be deflected over a suitable area of the target of the tube for the system in which it is to be employed. For example, were the tube to be used with the system of Fig. 1, one ray should be deflected about the center point between points A and C of the target as shown in Fig. 3 and a second ray should be deflected about the center point between points A and B of the target as shown in Fig. 3. Likewise, for the system of Fig. 4 one ray should be deflected about point A as center-point to provide the circular loci and the second should be deflected about the center-point between points A and B to provide the elliptical loci. Of course, for the system to be described in connection with Figs. 6 and 7 three rays are required, one ray being deflected about the midpoint between A and B, a second about the midpoint between A and C, and the third about the mid-point between A and D of the target of Fig. 7.

In Fig. 6 the apparatus is the same as for Fig. 1 at stations A, B and C and at station D of Fig. 6 a third set of receiving station apparatus identical with that at stations B and C is provided. The cathode ray oscilloscope in this case having, as above described, three rays controlled to provide three elliptical loci for a particular reflecting object. In other words at each of the receiving stations 152, 154 and 156 of Fig. 6 there is a receiving antenna, a receiver, a beat-note frequency converter and a pair of motor-driven potentiometers similar to antenna 16, converter 20, and potentiometers 22 at station B of Fig. 1 and at transmitting station 150 of Fig. 6 there is a transmitter similar to transmitter 10 which energizes an antenna similar to antenna 12 at station A of Fig. 1. The cathode ray indicator may, of course, be located at any one of the four stations, interconnecting lines 158, 160 and 162 providing for transmission of the necessary deflecting voltages from the other three stations. Obviously, each of two or more of the stations can be provided with indicators if desired and an additional indicator can be located at a central control point or at some remote point such as a coast guard central headquarters or the like.

Fig. 7 illustrates the type of indication provided by the system of Fig. 6, the common intersection of the three elliptical loci indicating the position of the reflecting object.

In Fig. 8 a triangle is indicated the three corners of which are the stations A and B and the object 14, respectively. Normally in systems of the invention stations A and B will be at known fixed points and the distance between them will be known. The combined distance from the station A to the object and from the object to station B is determined by the method of the invention as practiced, for example, in the systems of Figs. 1 and 4. Furthermore, in the system of Fig. 4 the distance from station A to the object is also determined so that all sides of the triangle become known and the angle or direction of the object from either station A or station B can then be readily obtained from conventional trigonometric formulae. From this it is apparent that systems of the invention, as exemplified by the embodiment of Fig. 4, provide for the precise determination of the azimuth angles of a particular reflecting object with respect to the stations of the system if they are desired.

Numerous modifications of the methods of applying the principles of the invention will readily occur to those skilled in the art. For example, the observing stations may be located on marine craft, or even on aircraft, radio communication channels being substituted for conductive transmission lines between the stations. The instantaneous absolute positions and relative positions of such mobile craft can, of course, be established by any of the numerous position determining methods well known to those skilled in the art. The principles of the invention are defined in the appended claims.

What is claimed is:

1. In an object locating system, a transmitting station at a first known fixed point, said station broadcasting wave energy over a predetermined area to strike an object at an unknown point within said area, a receiving station at a second known fixed point remote from said first point, said receiving station including apparatus adapted to receive and combine said wave energy reflected from said object in said area and said wave energy received directly from said transmitting station, and apparatus at said receiving station, electrically connected to said receiving apparatus and responsive to the combined received reflected energy and the directly received energy, to generate a first voltage the amplitude of which is a function of the difference between the path travelled by said reflected energy and that travelled by said directly received energy, a first converting device adapted to convert said first voltage into a first sine wave of a predetermined frequency and substantially the same amplitude as said first voltage, a second converting device adapted to convert said first voltage into a second sine wave of said predetermined frequency displaced 90° in phase from said first sine wave, an adjustable voltage dividing device interposed across the input of said second converting device whereby the amplitude of said second sine wave can be adjusted to a reduced value with respect to the amplitude of said first sine wave and a cathode ray indicator having horizontal and vertical deflecting means, the output sine wave of said first converting device being electrically connected to said horizontal deflecting means and the output sine wave of said second converting device being electrically connected to said vertical deflecting means, whereby the system can be adjusted to visually indicate an elliptical locus on which said object is located.

2. In an object locating system, a transmitting station at a first known fixed point, said station broadcasting wave energy over a predetermined area to strike an object at an unknown point within said area, a first receiving station at a second known fixed point remote in a first direction from said transmitting station, a second receiving station at a third known fixed point remote in a second direction from said transmitting station, both of said receiving stations including apparatus adapted to receive and combine said wave energy reflected from said object and said wave energy received directly from said transmitting station and apparatus at each of said receiving stations electrically connected to said receiving apparatus at said stations, respectively, and responsive to the combined received reflected energy and the directly received energy to generate a first voltage the amplitude of which is a function of the difference between the path travelled by said reflected energy and that travelled by said directly received energy, a first converting device adapted to convert said first voltage into a first sine wave of a predetermined frequency and substantially the same amplitude as said first voltage, a second converting device adapted to convert said first voltage into a second sine wave of said predetermined frequency displaced 90° in phase from said first sine wave, an adjustable voltage dividing device interposed across the input of said second converting device whereby the amplitude of said second sine wave can be adjusted to a reduced value with respect to the amplitude of said first sine wave and a cathode ray indicator having horizontal and vertical deflecting means, the output sine wave of said first converting device being electrically connected to said horizontal deflecting means and the output sine wave of said second converting device being electrically connected to said vertical deflecting means, whereby the system can be adjusted to visually indicate for each receiving station an elliptical locus on which said object is located.

3. In an object locating system a transmitting station at a first known point, said station broadcasting a frequency modulated wave over a predetermined area, a receiving station at a second known point within said area remote from said first point, said receiving station including apparatus adapted to receive and combine the wave directly from said transmitting station and reflections of said wave from an object at an unknown point within said area, means electrically connected to said receiving apparatus and responsive to the combined directly received and received reflected waves for obtaining a voltage proportional to the difference in the distances of the paths traveled by the respective received waves and means responsive to said voltage comprising a first converting device adapted to convert said voltage into a first sine wave of a predetermined frequency and of like amplitude with said voltage, a second converting device adapted to convert said first voltage into a second sine wave of said predetermined frequency displaced 90° in phase with respect to said first sine wave, adjustable means for reducing the amplitude of said second sine wave and an oscilloscopic indicator having horizontal and vertical electrical deflecting means, the output of said first converting device being connected electrically to said horizontal deflecting means and the output of said second converting device being connected electrically to said horizontal deflecting means whereby the system can provide a visual representation to a reduced scale of an elliptical locus upon which said reflecting object is located.

4. In an object locating system a transmitting station at a first known point, said station broadcasting a frequency modulated wave over a predetermined area, a plurality of receiving stations at a like plurality of different known points within said area, said last-mentioned points each being remote from said first point and from each other, apparatus at each receiving station for receiving and combining the directly transmitted wave and reflections of said wave from an object at an unknown point within said area, apparatus at each receiving station electrically connected to said receiving apparatus at said station and responsive to said combined waves for obtaining voltages indicative of a locus upon which the reflecting object is located and means operatively connected with said last stated apparatus at said plurality of receiving stations for reproducing visually to a convenient scale and in correct mutual relationship, said plurality of loci said last stated means comprising a cathode ray oscilloscope having a plurality of ray generating means equal in number to the number of the said plurality of receiving stations, each ray generating means having associated therewith ray centering means and horizontal and vertical deflecting means, the voltage from each receiving station being electrically connected to one of said horizontal and vertical deflecting means by way of a converting circuit each converting circuit comprising a first converting device adapted to convert the voltage into a first sine wave of a predetermined frequency and of like amplitude with said voltage, a second converting device adapted to convert said voltage into a second sine wave of said predetermined frequency displaced 90° in phase with respect to said first sine wave, adjustable means for reducing the amplitude of said second sine wave, the output of said first converting device connecting electrically with said horizontal deflecting means and the output of said second converting device connecting electrically with said vertical deflecting means whereby the position of said reflecting object is indicated by the common point of intersection of said loci.

5. In an energy wave reflection type object detecting system for detecting the intrusion of a reflecting object into an extensive area, the combination which includes at a first known point means for transmitting wave energy to blanket the entire said area, means at a second known point for non-directively receiving said wave energy directly from said first point and by reflection from an intruding reflecting object at any point within said area, means at said second point for combining said directly received energy and said received reflected energy and deriving therefrom a signal indicative of a discrete locus upon which the reflecting object is located and means for presenting a visual reproduction to a convenient scale of said locus said last stated means comprising devices adapted to convert said signal into first and second sine waves, displaced 90° in phase with respect to each other, amplitude adjusting means for at least one of said sine waves and an oscilloscopic indicator having horizontal and vertical deflecting means, said converting devices being electrically connected to said deflecting means to apply one of said sine waves to the horizontal deflecting means and the other to the vertical deflecting means.

6. In an energy wave reflection type object detecting system, for detecting the intrusion of a reflecting object into an extensive area, the combination which includes at a first known point means for transmitting energy to blanket the entire area, a plurality of receiving means distributed one each at a like plurality of known receiving points, respectively, for non-directively receiving at each of said plurality of known receiving points, said wave energy directly from said first point and by reflection from said intruding reflecting object at any point within said area, means at each of said plurality of receiving points for combining said directly received energy and said received reflected energy and deriving therefrom a signal indicative of a discrete locus upon which the reflecting object is located and means for presenting visual reproductions to a convenient scale of the plurality of loci thus indicated, the reproduced loci being positioned with respect to each other in the same relative manner in which the actual loci are positioned in the area under observation said last stated means comprising in combination an oscilloscopic indicator of the plural ray type having at least as many ray generating means as the said system has receiving means, a ray centering means and horizontal and vertical deflecting means associated with each ray generating means, and a plurality of converting circuits, one circuit electrically connected between each receiving means and one set of horizontal and vertical deflecting means of said oscilloscopic indicator, each converting circuit comprising devices adapted to convert the signal indicative of a discrete locus from its associated receiving means into first and second sine waves, displaced 90° in phase with respect to each other, amplitude adjusting means for at least one of said sine waves, the converting circuit supplying one of said sine waves to the associated horizontal deflecting means and the other sine wave to the associated vertical deflecting means of said oscilloscopic indicator.

7. The combination of claim 6 in which one receiving means is located substantially at the transmitting point.

8. An energy reflection type object detecting system comprising in combination an omnidirectional energy transmitting means, an omnidirectional energy receiving means, means electrically connected to said receiving means for combining directly received and received reflected energy and deriving from said combined energy a signal indicative of a locus of the point from which reflections are received and means for providing a visual reproduction to a convenient scale of said locus, said last means comprising a first converting device for converting said signal to a first sine wave, a second converting device for converting said signal to a second sine wave displaced 90° in phase with respect to said first wave, a voltage adjusting means controlling the amplitude of at least one of said sine waves, and an oscilloscopic indicating device having horizontal and vertical deflecting means, said first converting device output being connected to one of said deflecting means and said second converting device output being connected to the other of said deflecting means.

9. In a system for detecting the presence of a reflecting object within an extensive area, the combination which comprises means at a first known point within said area for broadcasting energy over the entire said area, means at a second known point within said area remote from said first point for non-directionally receiving said energy, both as directly transmitted energy from said first point and as reflected energy from a reflecting object at any point within said area, means electrically connected to said last stated receiving means for combining said directly transmitted energy and said reflected energy to provide a signal indicative of a locus which includes the point from which said reflected energy is received, and means cooperatively associated with said combining means for producing a visual reproduction to a convenient scale of the locus, said last means comprising a first converting device for converting said signal to a first sine wave, a second converting device for converting said signal to a second sine wave displaced 90° in phase with respect to said first wave, a voltage adjusting means controlling the amplitude of at least one of said sine waves, and an oscilloscopic indicating device having horizontal and vertical deflecting means, said first converting device output being connected to one of said deflecting means, and said second converting device output being connected to the other of said deflecting means.

HORACE T. BUDENBOM.

REFERENCES CITED

The following references are of record in the file of this patent:

UNITED STATES PATENTS

| Number | Name | Date |
| --- | --- | --- |
| 2,225,046 | Hunter | Dec. 17, 1940 |
| 2,247,662 | Newhouse | July 1, 1941 |
| 2,248,215 | Budenbom | July 8, 1941 |
| 2,268,587 | Guanella | Jan. 6, 1942 |
| 2,301,929 | Budenbom | Nov. 17, 1942 |
| 2,312,761 | Hershberger | Mar. 2, 1943 |
| 2,406,953 | Lewis | Sept. 3, 1946 |
| 2,427,219 | Luck | Sept. 9, 1947 |
| 2,427,220 | Luck | Sept. 9, 1947 |